United States Patent [19]

Lowther

[11] Patent Number: 5,667,618
[45] Date of Patent: Sep. 16, 1997

[54] METHOD FOR MAKING TRANSLUCENT COLORED-BACKED FILMS AND CONTINUOUS LENGTH MADE THEREBY

[76] Inventor: Ronald W. Lowther, 3435 Ash Row Crescent, Mississauga, Ontario, Canada, L5L 1K3

[21] Appl. No.: 477,489

[22] Filed: Jun. 7, 1995

Related U.S. Application Data

[63] Continuation of Ser. No. 135,946, Oct. 12, 1993, abandoned.

[51] Int. Cl.[6] .................. B32B 31/12; B32B 7/12
[52] U.S. Cl. .............. 156/249; 156/272.6; 156/277; 156/324; 428/41.7; 428/41.8; 40/594
[58] Field of Search ............... 156/235, 249, 156/238, 240, 272.6, 277, 306.3, 324; 101/116, 127, 128.21; 40/594, 611, 626, 630; 428/40, 195, 211, 913.3, 41.7, 41.8

[56] References Cited

U.S. PATENT DOCUMENTS

| | | |
|---|---|---|
| 3,354,519 | 11/1967 | Jansen . |
| 3,783,779 | 1/1974 | Greenwood et al. . |
| 3,889,595 | 6/1975 | Jaffa . |
| 4,134,339 | 1/1979 | Iten . |
| 4,193,829 | 3/1980 | Kourtides et al. . |
| 4,285,274 | 8/1981 | Katsuuma . |
| 4,292,752 | 10/1981 | Clark . |
| 4,601,759 | 7/1986 | Furubayashi et al. . |
| 4,667,428 | 5/1987 | Elmer . |
| 5,209,959 | 5/1993 | McNaul et al. . |
| 5,431,721 | 7/1995 | Pennaz et al. . |

FOREIGN PATENT DOCUMENTS 55-37378  3/1980  Japan .

*Primary Examiner*—David A. Simmons
*Assistant Examiner*—M. Curtis Mayes
*Attorney, Agent, or Firm*—David H. Judson

[57] ABSTRACT

A method is described for making colored backed film material using a polyvinyl fluoride (PVF) film having a first face and a second face opposite the first face. The method comprises the steps of coating the first face of the PVF film with an ink-receptive coating. A carrier is then statically laminated to the second face of the PVF film. Using a rotary web printing apparatus, an acrylic ink is then continuously applied onto the first face of the PVF film. After drying the ink, the PVF film is separated from the carrier and the colored PVF film is coated with a pressure-sensitive adhesive and provided with a release paper.

7 Claims, 3 Drawing Sheets

5,667,618

METHOD FOR MAKING TRANSLUCENT COLORED-BACKED FILMS AND CONTINUOUS LENGTH MADE THEREBY

This is a continuation of application Ser. No. 08/135,946 filed on Nov. 12, 1993 now abandoned.

TECHNICAL FIELD

The present invention relates generally to methods for manufacturing translucent, colored vinyl films for use, for example, in back-lit outdoor signs.

BACKGROUND OF THE INVENTION

Back-lit outdoor signs and awnings are known in the art. Typically, such signs and awnings include pressure-sensitive vinyl graphics on a suitable translucent carrier such as rigid acrylic or some other flexible sign-face material. These prior art constructions, however, suffer from several deficiencies including, without limitation, solar degradation of the color graphics and environmental dirt contamination on the face of the graphics.

It is also known in the prior art to address such deficiencies of the prior art used color-pigmented polyvinyl fluoride ("PVF") film, such as DuPont® TEDLAR® film. TEDLAR is a thin, generally clear film that is dirt-resistant and exhibits excellent UV resistance. Such color-pigmented film, however, is difficult and expensive to produce, and it is only commercially available in a relatively few standard colors which do not satisfy the sign industry's requirements to provide custom colors.

Another approach to solving the problems of the prior art has been to laminate a pressure-sensitive colored film (sold commercially as SCOTCHCAL®) to a white fabric base formed by vinyl-coating a nylon mesh (PANAFLEX®). This process produces a flexible sign material but this material wears poorly, is subject to streaking and is expensive to produce.

Still another proposed solution to the deficiencies of the prior art has been to silkscreen colors onto TEDLAR film using a flatbed screen printing machine. This approach facilitates the formation of custom-colored PVF films but is not commercially practicable because the film can only be printed in a discrete (i.e., not continuous) manner. The size of each portion printed is limited to the area of the flatbed screen, and it is difficult to provide consistent coloration across multiple print cycles. In the flatbed silkscreen process, the heat in the inking room generally causes variation in coloration, e.g., pigment density and translucency, from screen to screen. Manufacturers of such silkscreened PVF film recommend that the silkscreened film be cut and ends be matched for coloration before application to a sign. In addition, it is not possible to perfectly match (register) the ink from screen to screen in such prior art techniques. That is, it is not possible to get an invisible seam at the join between ink laid down from one screen and ink laid down adjacently. There is either an open area, i.e., an uninked area, of film, or an overlapped area at the join. The product resulting from the silkscreen process is unacceptable and extremely expensive to produce. This process cannot be used effectively on a commercial scale.

Heretofore, long lengths of translucent ink-coated film, with essentially uniform ink coloration along the entire length and which are devoid of ink seams, have not been available. The sign and awning industry has been plagued by limitations in manufacturing methods, which have tended to make the production of large signs an expensive proposition. The need for removal of such limitations has been apparent for a very long time.

There is therefore a need to provide an improved method of manufacturing translucent colored pressure-sensitive clear vinyl films for use in the sign and awning industry which overcome these and other problems of the prior art and which improve quality and reduce manufacturing cost.

BRIEF SUMMARY OF THE INVENTION

It is a general object of the present invention to provide a method of making translucent colored PVF films for use in the sign and awning industry.

It is yet another object of the present invention to provide a method of making such films in a continuous fashion to facilitate the production of color-backed film in continuous rolls.

It is a further object of the invention to manufacture such film using rotary screen web printing techniques that enable the production of custom-colored TEDLAR or other clear vinyl films in small to high quantity, yet low cost, production runs.

It is still another object of the invention to describe a method for manufacturing translucent colored PVF film wherein certain processing variables of the rotary web machine are within predetermined operating constraints to consistently create a high quality rolled product at low cost.

It is another feature of the invention to describe a method of continuously manufacturing colored TEDLAR films wherein the translucent acrylic ink has a predetermined viscosity and may be preprocessed to prevent streaking of the pigments therein during film production.

It is yet another object of the invention to describe a method of continuously manufacturing colored TEDLAR films wherein the film is preprocessed to increase the surface tension of the film prior to application of the ink.

In the preferred embodiment, a method is described for making colored backed film material using a polyvinyl fluoride (PVF) film having a first face and a second face opposite the first face, the first face pre-coated with an ink-receptive coating. According to the method, a carrier is first statically laminated to the second face of the PVF film. "Static" lamination means that the carrier is only temporarily laminated and can be later removed from the remainder of the film. Thereafter, a translucent acrylic ink is continuously applied onto the pre-coated first face of the PVF film to produce a colored PVF film. This film is then passed through an oven to dry the ink. After cooling, the colored PVF film is then separated from the carrier. Such separation may be effected while the PVF film is collected on a continuous roll.

If desired, an adhesive coating may be continuously applied to the first face of the PVF film after the PVF film is separated from the carrier. A backing paper is then continuously applied over the adhesive coating to produce a roll stock of colored film.

In use, the roll stock is cut to the appropriate size, the backing paper is removed and the color-backed film is then applied to a back-lit sign, awning or other suitable support.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar steps throughout the drawings.

DETAILED DESCRIPTION

Polyvinyl fluoride ("PVF") film, such as DuPont® TEDLAR® film, is well-known. TEDLAR is a thin, generally clear film that is dirt-resistant and exhibits excellent UV resistance. While in the preferred embodiment PVF film is used as the base web material, it should be appreciated that the method of the present invention is also useful for producing color-backed films made of other materials including, without limitation, polypropylene, polyvinyl chloride, polyester. The inventive process may thus be effected with other clear film polymer materials having surface tension characteristics suitable for supporting acrylic inks (either directly or through enhancement of such characteristics).

In the preferred embodiment, the acrylic inks are translucent. Such inks typically include three components: pigment, clear varnish (i.e., acrylic resins) and a solvent. These inks are commercially available in several basic colors. Custom colors are created by mixing appropriate commercial inks together (e.g., turquoise by mixing green, blue and white). According to the present invention, it is desirable to form custom colors (such as turquoise) by dispersing all necessary pigments (e.g., green, blue and white) into the clear varnish prior to putting the inks into solution. Thus, instead of forming separate inks and then combining them, it has been found desirable to disperse the pigments in the varnish first and then add the solvent. This reduces the tendency of the pigments to separate during application to the PVF film.

Figure 1:
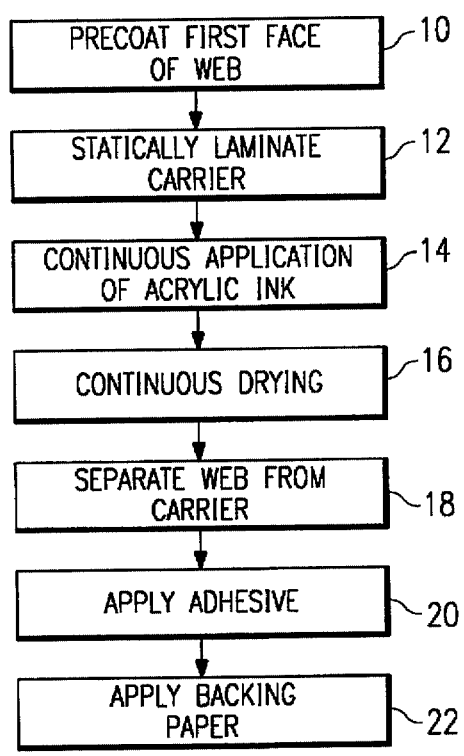
FIG. 1 is flowchart of the preferred processing steps of the present invention.

Referring now to FIG. 1, a flowchart is shown of the preferred processing steps of the present invention. As noted above, the method for making colored backed film material preferably uses a polyvinyl fluoride (PVF) film web or "base" having a first face and a second face opposite the first face. At step 10, the first face of the PVF film is preferably coated with an ink-receptive coating. Such coatings are known in the art and function to increase the surface tension of the PVF film to thus facilitate the adhesion of the acrylic ink. Although not meant to be limiting, the ink receptive coating may be TC-160 print receptive coating provided by Flexcon Manufacturing. The ink receptive coating is preferably applied during a pre-processing stage as opposed to during the application of the acrylic ink. Thus, in the preferred embodiment the PVF film may be said to be "pre-coated" with an ink receptive coating to facilitate the remaining processing steps. Of course, the method is not intended to be limited in this regard and the ink receptive coating may be applied to the PVF film as part of the preferred method of carrying out the invention.

Alternatively, the surface tension of the PVF film is increased by flame or corona etching, or by a combination of such etching and application of the ink receptive coating as described above. Such processing steps are known in the art. Of course, the step of enhancing the surface tension of the clear film may be omitted if the surface tension of the film is adequate to retain the acrylic ink for the specific application and/or the desired shelf life of the product.

Referring now back to FIG. 1, the method continues at step 12 wherein a carrier material is temporarily or "statically" laminated to the second face of the pre-coated PVF film (e.g., the PVF film having an ink receptive coating on its first face). As used herein, "static" lamination means that the carrier is not adhered to the PVF film in a positive sense (i.e., through an adhesive or the like) and thus can be later removed in an simple manner by just separating the carrier and film. The carrier sheet is preferably paper or clear polyester having a thickness of about 5.0 mil. The carrier is generally useful because the thickness of the PVF film is approximately 1.0 mil. PVF films having greater thicknesses tend to be milky or creamy in color and thus tend to produce poor color-backed material. The carrier sheet thus provides physical integrity to the clear film base so that the continuous ink processing may be effected as will hereafter be described. The carrier may be omitted if thicker, yet clear films are used as the base web material.

The method continues at step 14 wherein a translucent acrylic ink is continuously applied onto the pre-coated first face of the PVF film. At step 16, the translucent acrylic ink coating is continuously dried. Thereafter, at step 18, the colored PVF film is separated from the carrier, which can then be reused. The method then continues at step 20 through the continuous application of a pressure sensitive adhesive coating over the previously-coated first face of the PVF film. At step 21 a backing paper is continuously applied over the pressure sensitive adhesive coating.

Figure 2:
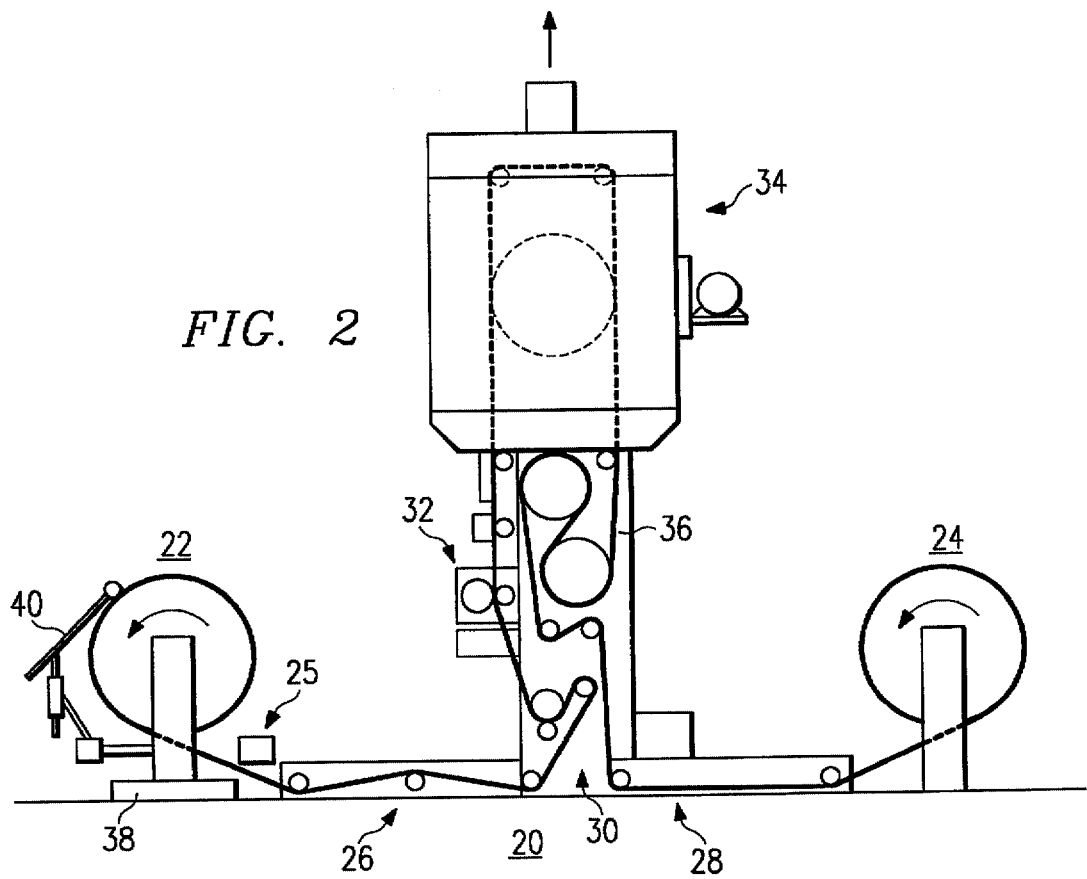
FIG. 2 is a schematic diagram of a rotary screen apparatus for use in the method of the present invention.

In the preferred embodiment of the method, a rotary web screen apparatus is used to provide continuous application of acrylic ink to a PVF film whose ink adhesion characteristic has been enhanced. One such apparatus, not to be considered by way of limitation, is the Stork Rotary Screen Coating/Printing Line for coating and printing sold commercially as Type PD-IV-4300/ML by Stork X-cel BV of Holland. Heretofore, Stork rotary screen printing machines have been used for printing such as wallpaper. The apparatus 20 is shown schematically in elevation in FIG. 2 and comprises a number of functional components: an unwind mechanism 22, a rewind mechanism 24, a corona discharge mechanism 25, a guide mechanism 26, an outfeed mechanism 28, a drive mechanism 30, a rotary screen coating/printing unit 32, a drying mechanism 34, and a cooling mechanism 36. The unwind mechanism 22 comprises a movable stand 38 and a pneumatic brake 40. The PVF film, with the ink receptive coating on the first face and the carrier sheet laminated to the second face, is supported in rolled form on the movable stand 38.

The pre-coated PVF film (with the carrier sheet laminate) is then threaded under the corona discharge mechanism 25, through the guide mechanism 26, through the drive mechanism 30, through the rotary screen coating/printing unit 32, through the drying mechanism 34, through the cooling mechanism 36, and then through the outfeed mechanism 28. The outfeed mechanism 28 guides the web to the rewind mechanism 24 and also functions to separate or delaminate the carrier sheet from the remainder of the material.

The corona discharge mechanism 25 operates to produce an electrical field disturbance across the first face of the film, thereby increasing the surface tension of the ink receptive coating on the PVF film. The corona discharge enhances the adhesion of the translucent acrylic ink to the film and thus lengthens the effective life of the product. The corona discharge is optional, and when the mechanism is used it may not be necessary to apply an ink receptive coating. In the preferred embodiment, both the ink receptive coating and the corona discharge 25 are used to improve the ink receptivity of the film. The corona treating unit comprises a generator, a high voltage transformer and an electrode which function to provide a corona discharge at the electrode adjacent the passing web. One such unit is a Model PBS Corona Discharge Unit manufactured by Sherman Treaters (North America) Inc. of Ontario, Canada.

After the pre-coated (or otherwise pre-treated) PVF film is threaded through the apparatus in the above-described manner, the drive mechanism 30 is activated. The PVF film is then unwound from the unwind mechanism and continuously processed through the apparatus. As the film passes through the rotary screen coating/printing unit 32, translucent acrylic ink is continuously applied onto the treated first face of the film.

Figure 3:
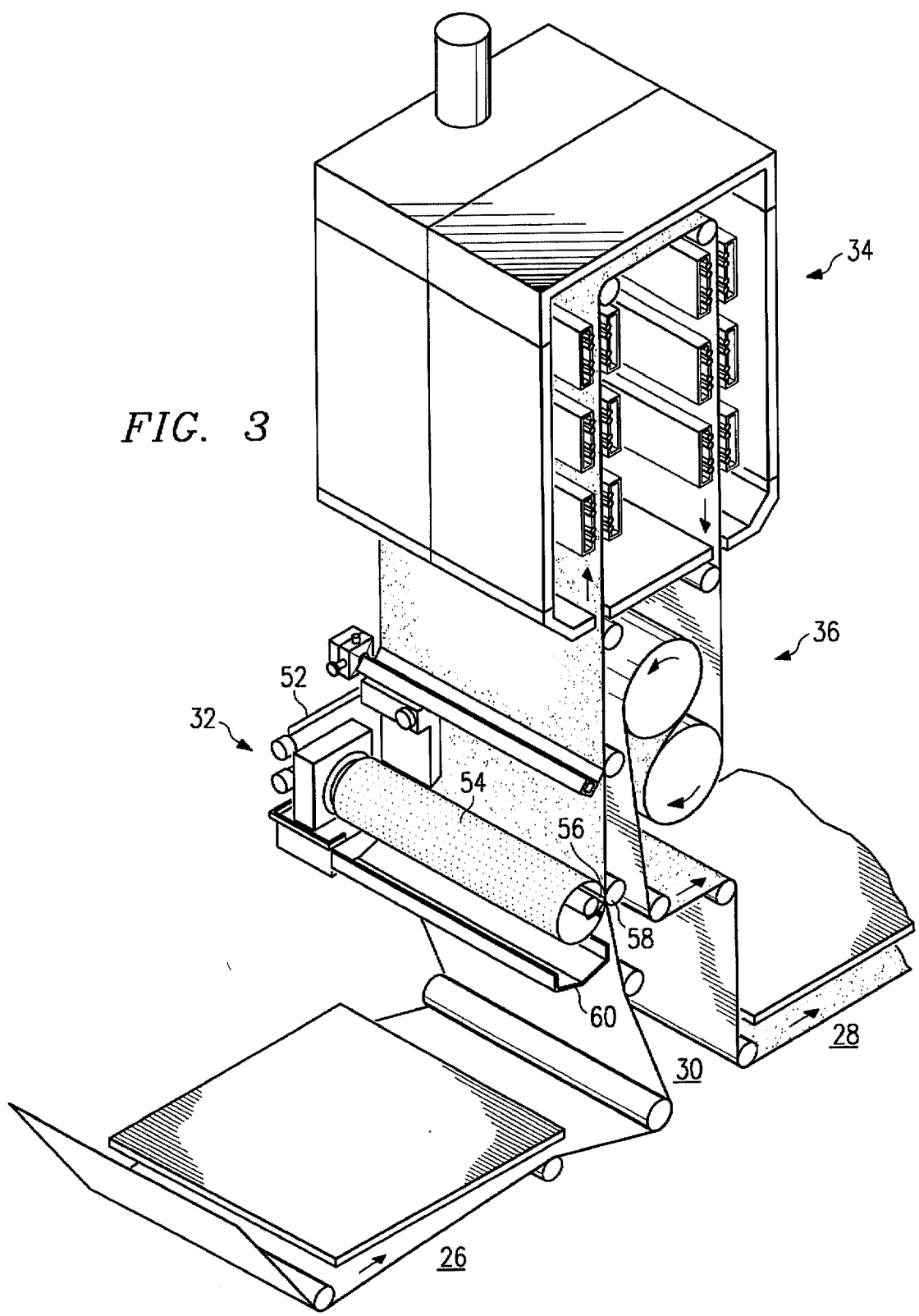
FIG. 3 is a detailed perspective view of the rotary screen printing apparatus for use in the inventive method.
Figure 4:
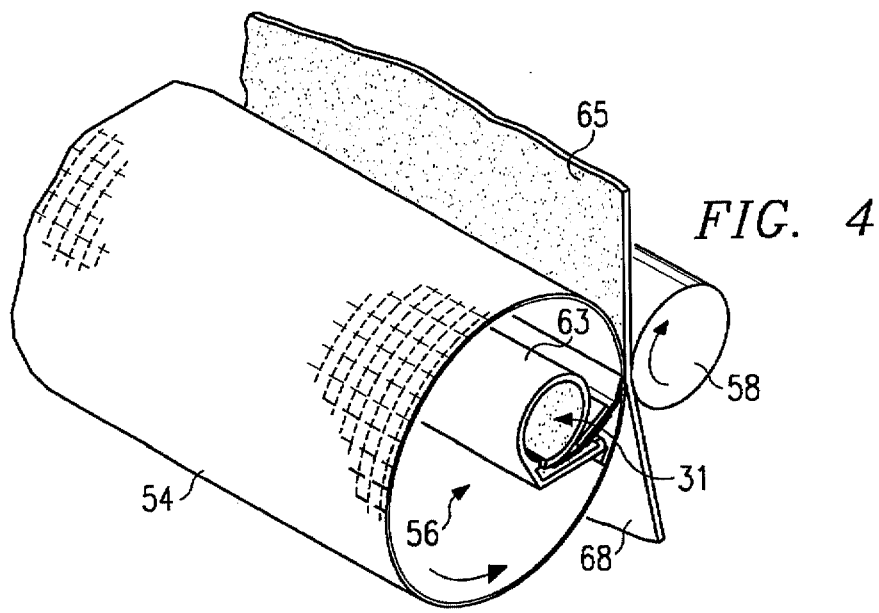
FIG. 4 is a detailed perspective view of the rotary screen and squeegee mechanism of the printing apparatus of FIG. 3.
Figure 5:
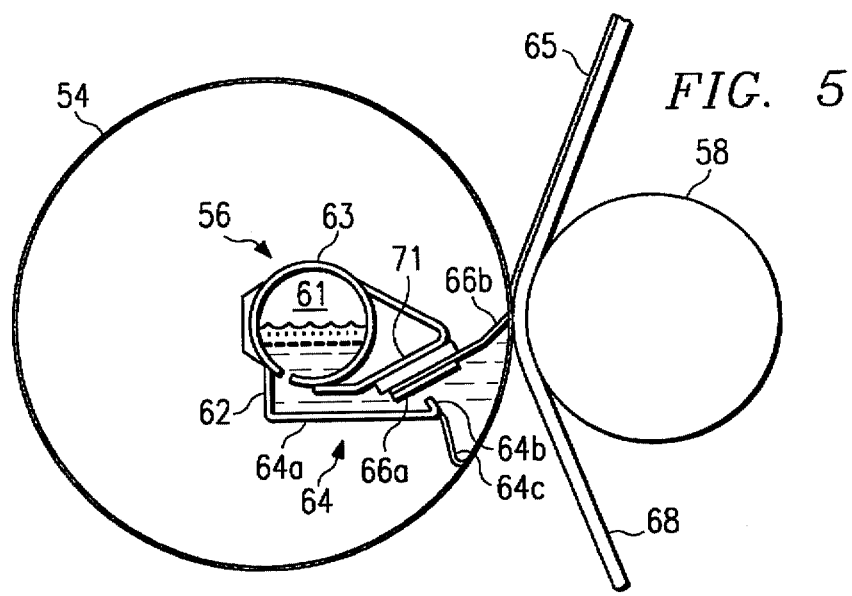
FIG. 5 is a schematic diagram of the rotary screen and squeegee mechanism showing the position of these components relative to the counter pressure roller of the apparatus.

This rotary web screen printing apparatus is shown in more detail in FIGS. 3–5. FIG. 3 shows a portion of the apparatus including the guide mechanism 26, the drive mechanism 30, the rotary screen coating/printing unit 32, the drying mechanism 34, the cooling mechanism 36 and a portion of the outfeed mechanism 28. Guide mechanism 26 includes the guide rollers 40 and 42, and the web passes under roller 40 and over roller 42 as shown. The drive mechanism includes rollers 44 and 46 upstream of the rotary screen coating/printing unit 32, and rollers 48 and 50 downstream of the cooling mechanism 36.

The primary component of the apparatus is the rotary screen coating/printing mechanism 32. Referring simultaneously to FIGS. 3–4, the mechanism comprises a printing/coating head 52, a seamless metal rotary screen 54, a squeegee 56 and a counter pressure roller 58. A tray 60 underlies the rotary screen for collecting excess ink. The printing/coating head 52 receives the translucent acrylic ink from a reservoir (not shown) and delivers the ink into the interior 61 of a circular body portion 63 of the squeegee. Referring now simultaneously to FIG. 4–5, the circular body portion 63 of the squeegee includes a longitudinal slot 62 along a portion of its length. A paste spreading blade 64 is attached to the body portion 63 and underlies the slot 62. The paste spreading blade has a first or tray portion 64a, a lip portion 64b and a flexible third portion 64c. A squeegee blade 66 overlies the portions 64b and 64c of the paste spreading blade and is retained in a clamp 71. The squeegee blade 66 includes a first portion 66a and a second portion 66b. The first portion is preferably formed of chromium steel and the second portion is formed of silicone rubber or polyurethane.

The web 68 passes in contact with seamless rotary screen between a distal edge of the squeegee blade and the counter-pressure roller 58 substantially as shown. As seen in FIG. 4, the rotary screen 54 rotates counterclockwise while the counter-pressure roller rotates clockwise. In operation, the head 52 receives the translucent acrylic ink, which is delivered along the interior 61 of the body portion 63. The ink passes out of the slot 62 and is collected between the paste spreading blade and the squeegee blade. As the seamless rotary screen rotates, the squeegee blade forces the translucent acrylic ink through the screen and onto the web to form a coating 65.

Referring back to FIG. 3, after the acrylic ink is applied to the PVF film, the ink and film are passed through a drying mechanism 34, which preferably comprises a plurality of hot air blowers 70. The dryer removes the ink solvent to enable the web to be re-rolled. It is desirable to control the amount of drying because if too much of the solvent is removed, the ink becomes brittle. If too little solvent is removed, the ink remains sticky and the web cannot be effectively re-rolled.

After drying, the web is passed around a pair of cooling rollers 72 and 74 comprising the cooling mechanism 36. This mechanism lowers the temperature of the web. The web is then drawn through rollers 48 and 50 of the drive mechanism 30, and then passed through the outfeed mechanism having rollers 76 and 78. The carrier is then delaminated by the outfeed mechanism (and can be reused) and the color-backed film web is re-rolled on the rewind mechanism.

A translucent colored, pressure-sensitive PVF film can be formed with two additional processing steps. At step 16, a pressure sensitive adhesive coating is continuously applied to the inked first face of the PVF film after the PVF film is separated from the carrier. Although not meant to be limiting, preferably the adhesive is a non-toulene based composition that does not interfere with the ink. One such coating is V-156 pressure sensitive adhesive coating supplied by Flexcon Manufacturing. Such coatings are applied to the colored PVF film using, for example, a knife-over-roll apparatus, although the specific method of applying the adhesive coating is not meant to be limited in any way. Thereafter, a backing paper is continuously applied over the adhesive coating to form a translucent colored, pressure-sensitive PVF film.

The method of the present invention thus solves the problems of the prior art while allowing for the production of a color-backed film in continuous rolls by means of web machine seamless screen application of color. The rolls can be made in large widths (e.g., up to about eight feet). The color-backing can be matched to any custom color and can be manufactured in minimal to maximum quantity, low cost production runs. A great advantage for long sheets is that there is no transverse seams in the ink surface. Additionally, the PVF film has substantialy uniform coloration along its length, i.e., it is not subject to screen-to-screen non-uniformities. The resulting product satisfactorily addresses the problems of environmental dirt and solar degradation and facilitates the production of back-lit outdoor signs having pressure-sensitive vinyl graphics on a suitable translucent carrier or other sign face material.

Figure 6:
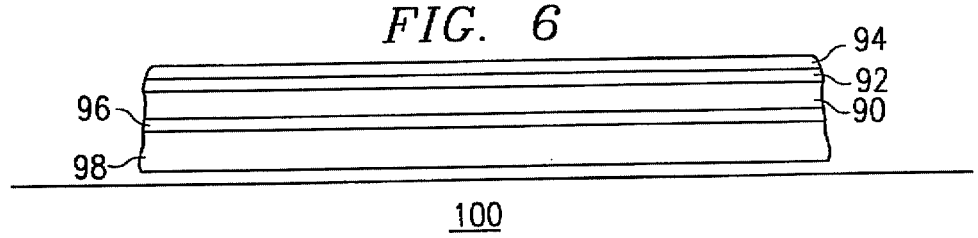
FIG. 6 is an side view of the preferred structure of the color-backed film manufactured according to the method of the present invention.

The translucent colored, pressure-sensitive film produced by the method of the present invention is shown in FIG. 6. The material comprises a TEDLAR® clear PVF film 90 (approximately 1.0 mil thick), a clear ink receptive coating 92 (approximately 0.03 mil thick), a coating of translucent custom-formulated colored ink 94, a clear pressure-sensitive adhesive coating 96, and a removable temporary backing paper 98 (approximately 5.0 mil thick). In use, the temporary backing paper 98 is removed and the material is applied to a translucent carrier or other sign face or awning material 100 so that the pressure sensitive adhesive is adhered to the translucent carrier, e.g., the sign face.

It has been found that controlling certain process variables and constraints significantly enhances the quality of the finished product. Preferably, the rotary web screen apparatus has an 80 mesh (i.e., 80 holes per square inch) screen and a predetermined thickness of approximately 150 microns. The openings in the screen are hexagonal and taper from the outside to the inside (i.e., to form conical openings). The squeegee blade is positioned with its blade tip at the heart of the counter pressure roller, i.e., where contact is made with the rotary screen. The squeegee pressure is relatively high and the length of the squeegee blade is relatively long. A preferred squeegee blade is an ULDOME Stainless Steel blade from Stork.

The translucent acrylic ink has a predetermined viscosity and is preferably approximately 5000 centipoise. The unwind and rewind mechanisms are run at the same predetermined speed between 10 and 12 meters per minute (and preferably 10 meters per minute) as the translucent acrylic ink is continuously applied to the pre-coated PVF film. The pre-coating is preferably TC-160 coating (with thickness of approximately 0.03 mil) provided by Flexcon Manufacturing. The oven preferably operates over a predetermined temperature range between 170 and 185 degrees Fahrenheit. Within these operating constraints and variables, the ink is much easier to spread and the pigments do not separate during the continuous application process. The inks are dried easily and the color-backed roll is able to be wound on the rewind mechanism without damaging the material.

It should be appreciated by those skilled in the art that the specific embodiments disclosed above may be readily utilized as a basis for modifying or designing other structures for carrying out the same purposes of the present invention. For example, the acrylic ink may be continuously applied to the PVF film by moving a print head along the length of a stationary length of film (instead of using a rotary web machine). It should also be realized by those skilled in the art that such equivalent constructions do not depart from the spirit and scope of the invention as set forth in the appended claims.

What is claimed is:

1. A method for making a polyvinyl fluoride film with a translucent acrylic ink thereon, the film having a first face and a second face opposite the first face, said film having a carrier sheet temporarily adhered to the second face of the polyvinyl fluoride film, comprising the steps of:

(a) forming a custom-colored translucent acrylic ink by first dispersing at least first and second pigments in a clear varnish and then adding a solvent to the dispersion, the acrylic ink having a viscosity of approximately 500 centipoise;

(b) treating the first face to make the polyvinyl fluoride film receptive to translucent acrylic ink;

(c) continuously applying the custom-colored translucent acrylic ink onto the treated first face using a seamless metal rotary screen applicator that enables application of the translucent acrylic ink in a substantially uniform layer along an entire length of the polyvinyl fluoride film at a speed between approximately 10 and 12 meters per minute and wherein said ink layer is substantially devoid of visually discernible ink joins, such that when the inked film is supported on a substrate and backlit, substantially no color gradations are visible in the translucent ink; and (d) drying the translucent ink coated polyvinyl fluoride film in an oven at a temperature range between approximately 170 and 185 degrees Fahrenheit.

2. The method as described in claim 1 wherein the step of treating includes flame etching.

3. The method as described in claim 1 wherein the step of treating includes a corona discharge treatment.

4. The method as described in claim 1 wherein the step of treating includes coating the polyvinyl fluoride film with a coating which is receptive to the custom-colored translucent acrylic ink.

5. The method as described in claim 1 further including the step of (e) stripping the carrier from the second face;

(f) applying a pressure sensitive adhesive film to the ink-coated surface; and (g) applying a strippable backing paper to the pressure sensitive adhesive.

6. The method as described in claim 1 wherein the seamless metal rotary screen applicator has a 80 mesh screen having a conically shaped hexagonal opening.

7. A continuous length of a laminate comprising a polyvinyl fluoride film having a colored translucent acrylic ink thereon, a pressure sensitive adhesive adhered to the ink, and a backing paper which is strippable from the pressure sensitive adhesive, the continuous length formed by:

(a) forming a custom-colored translucent acrylic ink by first dispersing at least first and second pigments in a clear vanish and then adding a solvent to the dispersion, the acrylic ink having a viscosity of approximately 500 centipoise;

(b) temporarily adhering a carrier to a face of the polyvinyl fluoride film;

(c) treating an opposed face of the polyvinyl fluoride film to make the opposed face of the film receptive to translucent acrylic inks;

(d) continuously applying the custom-colored translucent acrylic ink onto the treated first face using a seamless metal rotary screen applicator that enables application of the translucent acrylic ink in a substantially uniform layer along an entire length of the polyvinyl fluoride film at a speed between approximately 10 and 12 meters per minute and wherein said ink layer is substantially devoid of visually discernible ink joins, such that when the inked film is supported on a substrate and backlit, substantially no color gradations are visible in the translucent ink;

(e) drying the translucent ink coated polyvinyl fluoride film in an oven at a temperature range between approximately 170 and 185 degrees Fahrenheit; and (f) stripping the carrier from the face.

* * * * *